(12) United States Patent
Oh et al.

(10) Patent No.: US 10,857,895 B2
(45) Date of Patent: Dec. 8, 2020

(54) BATTERY CHARGING METHOD AND APPARATUS

(71) Applicant: Samsung Electronics Co., Ltd., Suwon-si (KR)

(72) Inventors: Duk Jin Oh, Seoul (KR); Young Hun Sung, Hwaseong-si (KR); Ju Wan Lim, Suwon-si (KR); Daeryong Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/154,813

(22) Filed: Oct. 9, 2018

(65) Prior Publication Data

US 2019/0202299 A1 Jul. 4, 2019

(30) Foreign Application Priority Data

Dec. 29, 2017 (KR) .................... 10-2017-0183621

(51) Int. Cl.
*B60L 53/10* (2019.01)
*H02J 7/00* (2006.01)
(Continued)

(52) U.S. Cl.
CPC .............. *B60L 53/11* (2019.02); *B60L 53/00* (2019.02); *B60L 58/12* (2019.02);
(Continued)

(58) Field of Classification Search
CPC ........... H01L 27/0207; H01L 21/76819; H01L 23/5226; H01L 21/76877; H01L 21/76816; H01L 23/528; H01L 2924/0002; G06F 17/5081; G06F 17/5077; Y10S 438/926; B60L 53/11; B60L 53/00; B60L 58/12;
(Continued)

(56) References Cited

U.S. PATENT DOCUMENTS 8,054,038 B2   11/2011   Kelty et al.
8,117,857 B2   2/2012    Kelty et al.
(Continued)

FOREIGN PATENT DOCUMENTS

CN   102472794 A   5/2012
CN   103053066 B   5/2015
(Continued)

OTHER PUBLICATIONS

Liu, Yi-Hwa, et al., "Search for an Optimal Rapid Charging Pattern for Lithium-Ion Batteries Using Ant Colony System Algorithm", *IEEE Transactions on Industrial Electronics*, vol. 52, Issue 5, Oct. 2005 (pp. 1328-1336).
(Continued)

*Primary Examiner* — Stacy Whitmore
(74) *Attorney, Agent, or Firm* — NSIP Law

(57) ABSTRACT

A battery charging method includes acquiring a functional relationship of a differential value of an amount of charge or a state of charge (SOC) with respect to a voltage of a battery based on the voltage or the SOC, determining charging steps for charging of the battery by analyzing the functional relationship, and generating a charging profile comprising charging currents for each of the charging steps to charge the battery.

29 Claims, 12 Drawing Sheets

(51) Int. Cl.
*H01M 10/48* (2006.01)
*H01M 10/44* (2006.01)
*H01M 10/42* (2006.01)
*H02J 7/04* (2006.01)
*B60L 53/00* (2019.01)
*B60L 58/12* (2019.01)

(52) U.S. Cl.
CPC ......... *H01M 10/425* (2013.01); *H01M 10/44* (2013.01); *H01M 10/443* (2013.01); *H01M 10/48* (2013.01); *H01M 10/486* (2013.01); *H02J 7/007* (2013.01); *H02J 7/0071* (2020.01); *H02J 7/0078* (2013.01); *H02J 7/007184* (2020.01); *H02J 7/045* (2013.01); *H02J 7/00712* (2020.01); *H02J 7/00714* (2020.01); *H02J 7/00718* (2020.01)

(58) Field of Classification Search
CPC .... H02J 7/0071; H02J 7/007184; H02J 7/007; H02J 7/0078; H02J 7/045; H02J 7/0077; H02J 7/00714; H02J 7/00718; H02J 7/00712; H01M 10/48; H01M 10/486; H01M 10/443; H01M 10/44; H01M 10/425
See application file for complete search history.

(56) References Cited

U.S. PATENT DOCUMENTS

| | | |
|---|---|---|
| 8,508,191 B2 | 8/2013 | Kim et al. |
| 8,618,775 B2 | 12/2013 | Hermann et al. |
| 8,624,560 B2 | 1/2014 | Ungar et al. |
| 8,961,203 B2 | 2/2015 | Lee |
| 8,972,213 B2 | 3/2015 | Zhang et al. |
| 2014/0002031 A1 | 1/2014 | Chaturvedi et al. |
| 2014/0062415 A1 | 3/2014 | Barsukov et al. |
| 2015/0364748 A1 | 12/2015 | Amiruddin et al. |
| 2016/0259011 A1* | 9/2016 | Joe .......... H01M 10/48 |
| 2017/0102436 A1* | 4/2017 | Tao .......... B60L 58/12 |
| 2018/0212458 A1* | 7/2018 | Kawai ...... H01M 4/58 |
| 2018/0292461 A1* | 10/2018 | Kim .......... H01M 10/425 |
| 2019/0084435 A1* | 3/2019 | Grace ........ H01M 10/482 |
| 2019/0168617 A1* | 6/2019 | Ling .......... B60L 50/66 |
| 2019/0339332 A1* | 11/2019 | Tachibana .......... H01M 10/48 |

FOREIGN PATENT DOCUMENTS

| | | |
|---|---|---|
| CN | 105552465 B | 5/2018 |
| EP | 3 358 704 A1 | 8/2018 |
| KR | 10-2017-0051031 A | 5/2017 |
| KR | 10-2017-0082258 A | 7/2017 |
| WO | 2017/030309 A1 | 2/2017 |

OTHER PUBLICATIONS

Anseán González, David, et al. "Efficient fast-charging strategies for Li-ion batteries." 28th *International Electric Vehicle Symposium and Exhibition* 2015, EVS 2015. 2015 (pp. 1-10).

Extended European Search Report dated May 13, 2019 in counterpart European Patent Application No. 18205366.0 (8 pages in English).

* cited by examiner

| Charging step | | #S1 | #S2 | #S3 | #S4 | #S5 | #S6 |
|---|---|---|---|---|---|---|---|
| SOC | % | 0~7 | 7~18 | 18~34 | 34~55 | 55~69 | 69~80 |
| DCIR | mΩ | 183 | 90 | 61 | 90 | 70 | 100 |
| C-rate | | 0.46 | 1.08 | 1.54 | 1.08 | 1.39 | 0.92 |
| Time | min | 9.1 | 6.1 | 6.2 | 11.7 | 6.1 | 5.8 |

FIG. 11
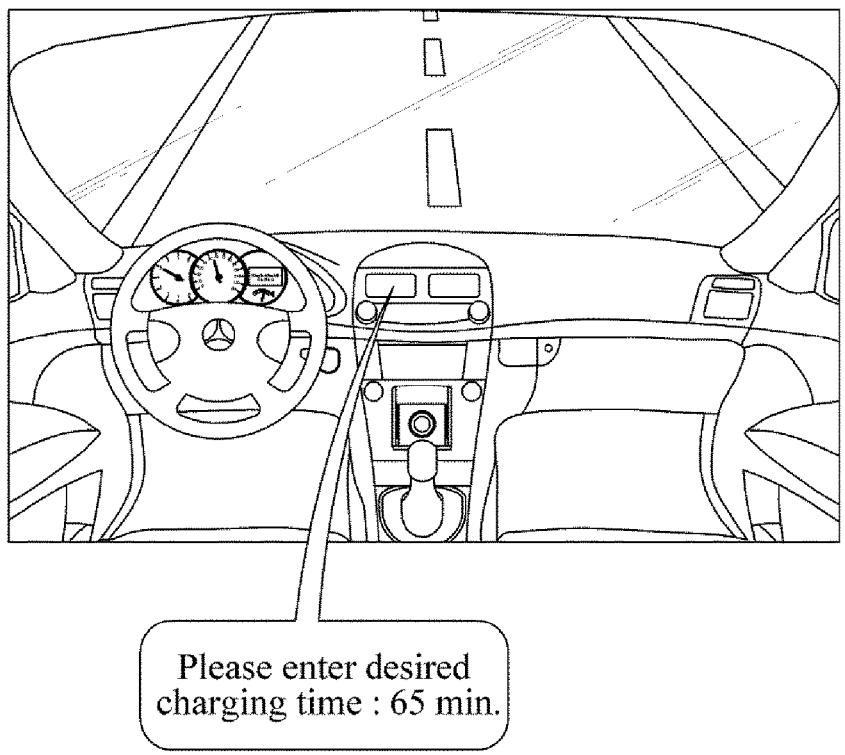
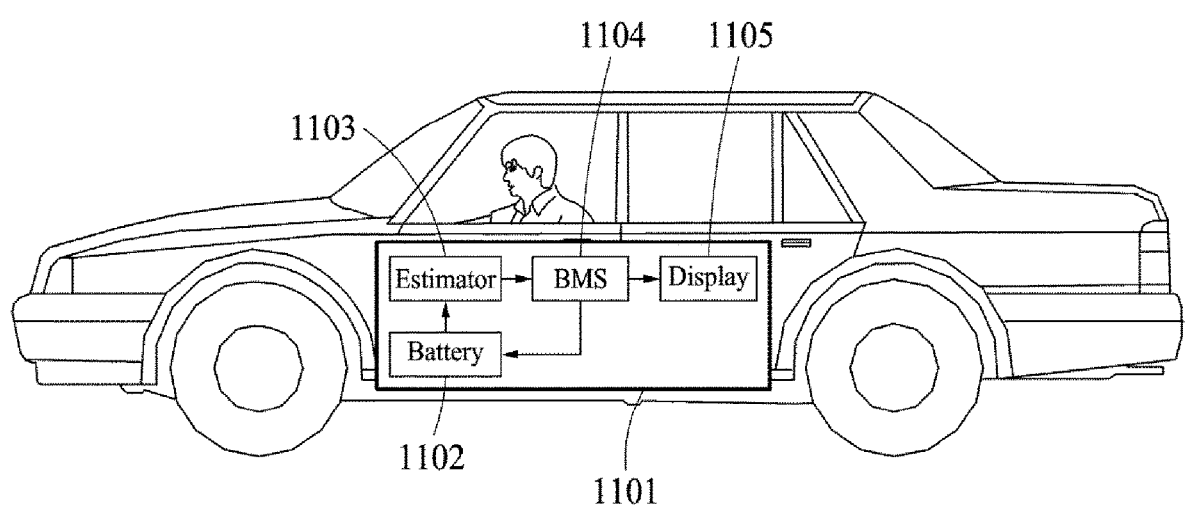

BATTERY CHARGING METHOD AND APPARATUS

CROSS-REFERENCE TO RELATED APPLICATIONS

This application claims the benefit under 35 USC § 119(a) of Korean Patent Application No. 10-2017-0183621, filed on Dec. 29, 2017, in the Korean Intellectual Property Office, the entire disclosure of which is incorporated herein by reference for all purposes.

BACKGROUND

1. Field

The following description relates to a technology for charging a battery.

2. Description of Related Art

A battery is used as a power source of, for example, a mobile device or an electric vehicle (EV), and various schemes for charging the battery are provided. Generally, a constant current-constant voltage (CC-CV) charging scheme may be used. In the CC-CV charging scheme, a battery is charged with a constant current (CC) until the battery's voltage reaches a predetermined voltage, and is then charged at a constant voltage (CV) until the battery's current reaches a low preset current. Alternatively, a multi-step charging scheme of charging the battery with a CC in multiple steps (from a high current to a low current) and/or a pulse charging scheme of repeatedly applying a pulse current in a short time unit may be used.

Since a relatively large amount of time is required under a CV condition in the CC-CV charging scheme, the CC-CV charging scheme is not suitable for fast charging. In the multi-step charging scheme and the pulse charging scheme, the battery is degraded due to fast charging. Also, experience-based charging schemes regardless of the internal state of the battery have limitations to control the degradation of the battery, and the effect of shortening the charging time is limited. As the number of users using a mobile device or an EV including a battery increases, fast charging becomes more beneficial.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a battery charging method includes acquiring a functional relationship of a differential value of an amount of charge or a state of charge (SOC) with respect to a voltage of a battery based on the voltage or the SOC, determining charging steps for charging of the battery by analyzing the functional relationship, and generating a charging profile comprising charging currents for each of the charging steps to charge the battery.

The functional relationship may represent a correspondence relationship between the voltage or the SOC that increases in response to the battery being charged and the differential value that changes in response to the battery being charged.

A horizontal axis of the functional relationship may represent the voltage that increases in response to the battery being charged or the SOC mapped to the voltage that increases in response to the battery being charged. A vertical axis of the functional relationship may represent the differential value that changes in response to the battery being charged.

The determining of the charging steps may include segmenting the functional relationship based on changes in main electrochemical reactions in response to the battery being charged; and determining the charging steps based on regions into which the functional relationship is segmented. The main electrochemical reactions may be determined based on a number of electrochemical reactions occurring in response to the battery being charged.

The determining of the charging steps may include segmenting the functional relationship based on ranges in which the differential value changes from increasing to decreasing; and determining the charging steps based on the ranges.

The determining of the charging steps may include detecting at least one peak on the functional relationship; and determining the charging steps based on the detected peak.

The determining of the charging steps based on the detected peak may include determining a first SOC or a first voltage corresponding to a start of a first charging step based on a first negative peak on the functional relationship; and determining a second SOC or a second voltage corresponding to an end of the first charging step and a start of a second charging step based on a second negative peak detected subsequent to the first negative peak. The first negative peak and the second negative peak may be points at which the differential value changes from decreasing to increasing.

The determining of the charging steps based on the detected peak may include determining a number of charging steps based on the detected peak; and determining charging steps corresponding to the number of charging steps.

The generating of the charging profile may include determining charging current ratios for each of the charging steps based on electrochemical characteristics corresponding to the charging steps; and determining charging currents for each of the charging steps based on the charging current ratios.

The determining of the charging current ratios may include acquiring impedances for each of the charging steps based on main electrochemical reactions corresponding to the charging steps; and determining the charging current ratios for each of the charging steps based on the impedances.

The determining of the charging current ratios may include setting a charging current ratio to decrease in response to an impedance increasing.

The acquiring of the impedances may include at least one of: estimating impedances by performing an electrical impedance spectroscopy (EIS) analysis for each of the charging steps; and estimating impedances based on direct current internal resistances (DCIRs) corresponding to the charging steps.

The determining of the charging currents my include acquiring a charging condition comprising a required charging time, a required amount of charge and at least one internal state limit condition; and determining the charging currents for each of the charging steps from an electrochemical model based on the charging condition and the charging current ratios.

The determining of the charging currents from the electrochemical model may include determining initial charging currents for each of the charging steps corresponding to the charging current ratios, based on the required charging time and the required amount of charge; estimating at least one internal state of the battery to which the initial charging currents are applied, for each of the charging steps, using the electrochemical model; and adjusting the initial charging currents based on whether the estimated internal state reaches at least one internal state limit condition for each of the charging steps, and determining the charging currents for each of the charging steps.

The determining of the charging currents from the electrochemical model may include adjusting ranges for each of the charging steps based on the charging condition and the charging current ratios.

The internal state limit condition may include any one or any combination of any two or more of an anode overpotential condition, a cathode overpotential condition, an anode active material surface lithium ion concentration condition, a cathode active material surface lithium ion concentration condition, a cell voltage condition and an SOC condition.

The acquiring of the functional relationship may include acquiring at least one of a temperature and a state of health (SOH) of the battery; and acquiring the functional relationship based on at least one of the acquired temperature and the acquired SOH.

In another general aspect, a battery charging method includes determining charging steps for each of main electrochemical reactions changes in response to a battery being charged; determining charging current ratios for each of the charging steps based on electrochemical characteristics corresponding to the charging steps; and generating a charging profile comprising charging currents for each of the charging steps based on the charging current ratios.

A non-transitory computer-readable storage medium may store instructions that, when executed by a processor, cause the processor to perform the battery charging method.

In another general aspect, a battery charging apparatus includes a processor configured to: acquire a functional relationship of a differential value of an amount of charge or a state of charge (SOC) with respect to a voltage of a battery based on the voltage or the SOC; determine charging steps for charging of the battery by analyzing the functional relationship; and generate a charging profile comprising charging currents for each of the charging steps to charge the battery.

In another general aspect, a battery charging apparatus includes a processor configured to: determine charging steps for each of main electrochemical reactions that change in response to a battery being charged; determine charging current ratios for each of the charging steps based on electrochemical characteristics corresponding to the charging steps; and generate a charging profile comprising charging currents for each of the charging steps based on the charging current ratios.

In another general aspect, a battery charging method includes acquiring a functional relationship of a differential value of an amount of charge or a state of charge (SOC) with respect to a voltage of a battery based on the voltage or the SOC; determining charging steps for charging of the battery by analyzing the functional relationship; setting a charging time; and generating a charging profile based on the charging time and an amount of charge to manage the battery.

The charging time may be set by an input of a user.

The charging time may be determined and set by a charging system of the battery.

The charging time may correspond to a fast charging mode of the battery.

The amount of charge may represent an estimated internal state of the battery.

The amount of charge may represent the SOC.

The charging profile may include charging currents for each of the charging steps to charge the battery.

The battery charging apparatus may determine whether charging within the charging time is sufficient to charge the battery based on the amount of charge.

When charging of the battery is not sufficient, the battery charging apparatus may generate a charging profile and charges the battery.

Charging currents in the charging profile may increase when the required charging time decreases, and decrease when the required charging time increases.

Other features and aspects will be apparent from the following detailed description, the drawings, and the claims.

BRIEF DESCRIPTION OF THE DRAWINGS

FIG. 11 illustrates an example of an operation of a battery charging apparatus.

Figure 1:
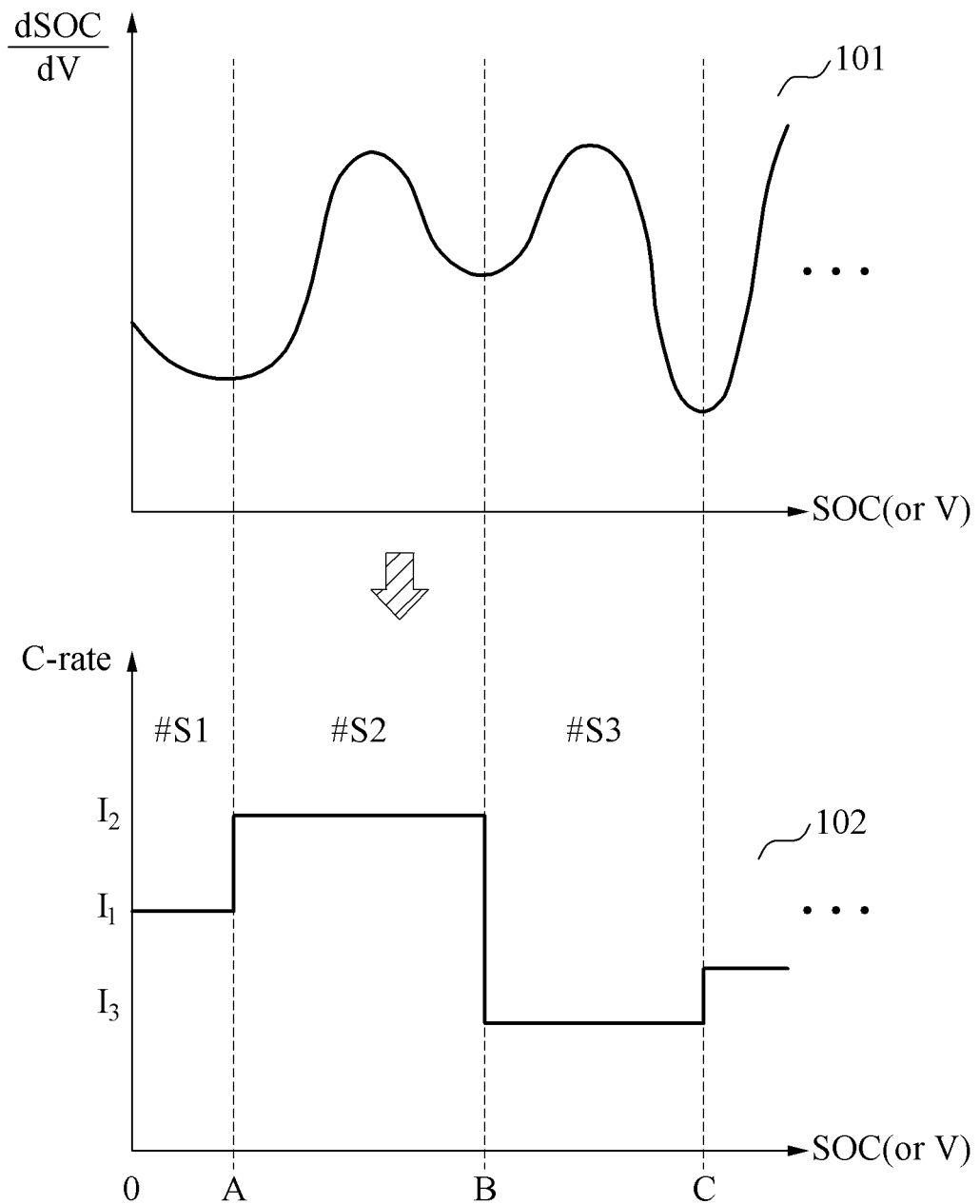
FIG. 1 illustrates an example of a battery charging method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following specific structural or functional descriptions are exemplary to merely describe the examples, and the scope of the examples is not limited to the descriptions provided in the present specification.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined herein, all terms used herein including technical or scientific terms have the same meanings as those generally understood by one of ordinary skill in the art and in view of the disclosure of this application. Terms defined in dictionaries generally used should be construed to have meanings matching with contextual meanings in the related art and the disclosure of this application and are not to be construed as an ideal or excessively formal meaning unless otherwise defined herein.

Hereinafter, examples will be described in detail below with reference to the accompanying drawings, and like reference numerals refer to the like elements throughout.

According to examples, a battery charging apparatus generates a charging profile based on an electrochemical reaction occurring in response to the battery being charged. The battery charging apparatus may quickly charge the battery while preventing a degradation of the battery using the generated charging profile. To minimize the degradation of the battery due to the fast charging during charging of the battery within a given charging time, the battery charging apparatus may generate a charging profile based on an electrochemical reaction and an electrochemical characteristic of the battery. The charging profile is a policy to supply current for charging of the battery, and is expressed as a sequence of C-rates for the charging. The C-rate will be defined below. The battery charging apparatus may charge the battery based on the generated charging profile. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The battery charging apparatus may determine charging steps for each of main electrochemical reactions that change when the battery is charged. Electrochemical reactions include an electrochemical reaction that occurs during charging of the battery. For example, an electrochemical reaction may occur due to electrons and lithium ions that move between an anode and a cathode of the battery, and different types of electrochemical reactions may occur within the battery in a complex manner. The pattern of an electrochemical reaction is affected by, for example, a current, a voltage, a temperature, a state of charge (SOC) and a state of health (SOH) of the battery. The SOC and the SOH will be defined below. The type of electrochemical reactions may be determined based on an anode, a cathode, an electrolyte or a separator of the battery.

For example, a dominant electrochemical reaction among electrochemical reactions occurring in response to a battery being charged, changes in response to the battery being charged. In this example, the dominant electrochemical reaction is referred to as a "main electrochemical reaction." Whether an electrochemical reaction is dominant is determined based on, for example, the number of reactions or a physicochemical quantity of the battery. The number of reactions or a physicochemical quantity of the battery that are defined as main electrochemical reactions may be determined based on, for example, the number of reactions or a physicochemical quantity being greater than a predetermined threshold. For example, a SOC or voltage changes when the battery is charged, and a main electrochemical reaction corresponding to the changed SOC or voltage is determined by a differential value of an amount of charge or the SOC with respect to the voltage. The battery charging apparatus may classify SOC or voltage ranges based on main electrochemical reactions that change in response to the battery being charged, and determine charging steps corresponding to the classified SOC or voltage ranges.

The battery charging apparatus may determine charging current ratios for each of the charging steps based on electrochemical characteristics corresponding to the charging steps. The battery charging apparatus may identify the electrochemical characteristics corresponding to the charging steps determined for each of the main electrochemical reactions. The charging steps determined based on the electrochemical reactions have different electrochemical characteristics that influence the charging of the battery. For example, the electrochemical characteristics corresponding to the charging steps are expressed by impedances corresponding to the charging steps based on the main electrochemical reactions corresponding to the charging steps. The battery charging apparatus may determine charging current ratios based on the electrochemical characteristics identified for each of the charging steps. The battery charging apparatus may generate a charging profile including charging currents for each of the charging steps based on the charging current ratios.

The battery charging apparatus may estimate an internal state of the battery based on an electrochemical model and controls charging of the battery based on the estimated internal state. When a charging time desired by a user is input, the battery charging apparatus may determine whether charging within the input charging time is possible based on a required amount of charge. The required amount of charge is an amount of charge required for charging, and is expressed by, for example, a SOC. The battery charging apparatus derives a charging profile with an excellent battery life characteristic while satisfying a charging time input by a user based on an estimated internal state of the battery and a boundary condition. In the following description, the given charging time is referred to as a "required charging time," and the boundary condition is referred to as an "internal state limit condition."

The required charging time may be input or set by a user or a manager. Also, the required charging time may be set automatically by a charging system of a battery or set in advance based on various examples. For example, a required charging time corresponding to a fast charging mode of a battery is a time that is set in advance to complete charging, and the battery charging apparatus may determine whether charging of the battery within an automatically set time is possible in response to the fast charging mode, or generate a charging profile and charge the battery. Overall description of a battery charging method will be provided below with reference to FIGS. 1 and 2. Description of a generation of a charging profile will be provided below with reference to FIG. 3. Description of an operation of determining charging steps will be provided below with reference to FIGS. 4A and 4B. Description of an operation of determining charging currents will be provided below with reference to FIGS. 5, 6A and 6B. Description of information used to generate a charging profile will be provided below with reference to FIG. 7. An example of a method of generating a charging profile will be described below with reference to FIG. 8. An example of a battery charging method will be described below with reference to FIG. 9. Description of an internal state of a battery will be provided below with reference to FIG. 10. An application example of a battery charging method will be described below with reference to FIG. 11, and an example of a configuration of a battery charging apparatus will be described below with reference to FIG. 12.

Figure 2:
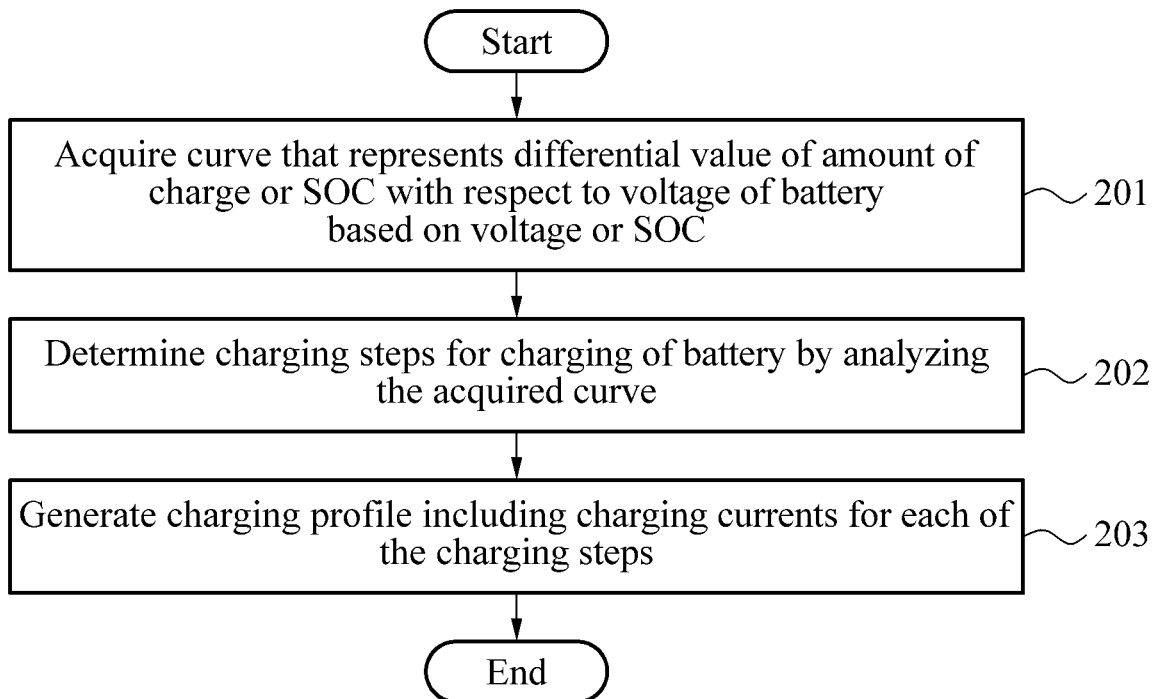
FIG. 2 is a flowchart illustrating an example of a battery charging method.

FIG. 1 is a diagram illustrating an example of a battery charging method, and FIG. 2 is a flowchart illustrating an example of a battery charging method.

Referring to FIGS. 1 and 2, in operation 201, a battery charging apparatus acquires a functional relationship or a curve 101 that represents a differential value of an amount of charge or a SOC with respect to a voltage of a battery based on the voltage or the SOC. Herein, though references will be made to such curves, these references should be understood as also referring to alternate functional relationships representing similar or the same information in other forms or formats, through various examples. The acquiring of the curve 101 includes, for example, generating a curve based on provided information, or acquiring or receiving of a curve from a server or a memory that may be located as a database inside or outside the battery charging apparatus. A database is implemented as a memory included in the battery charging apparatus, and/or an external or remote device, for example, a server, that is connected wirelessly or by a wire or a network to the battery charging apparatus. The curve 101 is not necessarily represented by a graph with a curve, and may partially include a discontinuous point, a nondifferentiable point or a region having a constant slope, by an experimental measurement or a simulated estimation.

The SOC is a parameter that indicates a charging state of a battery. The SOC indicates a level of energy stored in the battery and an amount of SOC may be expressed as a percentage unit between 0 to 100%. For example, 0% indicates a fully discharged state and 100% indicates a fully charged state, which may be variously modified and defined in various examples. A variety of schemes may be employed to estimate or measure the SOC.

The curve 101 shows a correspondence relationship between a SOC or a voltage V that increases in response to the battery being charged and a differential value dSOC/dV that changes in response to the battery being charged. The differential value is replaced by, for example, a differential value dQ/dV of an amount of charge with respect to the voltage. In an example, the horizontal axis of the curve 101 represents a voltage that increases in response to the battery being charged, or a SOC mapped to the voltage that increases in response to the battery being charged. A vertical axis of the curve 101 represents a differential value dSOC/dV or dQ/dV that changes in response to the battery being charged. Hereinafter, an example in which the horizontal axis of the curve 101 represents the SOC or voltage and the vertical axis of the curve 101 represents dSOC/dV or dQ/dV, is described, however, a curve representing electrochemical reactions that change in response to the battery being charged may be defined or designed using various schemes.

The battery charging apparatus may acquire a curve corresponding to a battery to be charged among stored curves, based on a SOH, a temperature and/or a characteristic of the battery, or generate a curve through a simulation or directly charges the battery. The battery charging apparatus may charge the battery with a preset constant current (CC), to measure or estimate a change in a SOC based on a change in a voltage, and to generate a curve corresponding to the battery. A curve representing dSOC/dV or dQ/dV corresponding to the battery may be acquired using various schemes.

The SOH is a parameter that quantitatively represents a change in a characteristic of a battery due to an aging effect, that is, a degradation phenomenon, and indicates the degree by which a capacity of the battery is degraded. Various schemes may be used to estimate or measure a SOH. When the SOH of the battery changes, the curve 101 changes as well.

The battery charging apparatus is an apparatus configured to process information associated with charging of a battery and may be implemented as, for example, a hardware and software instructions, a hardware module or a combination thereof. For example, the battery charging apparatus is implemented by a battery management system (BMS). The BMS is a system configured to manage a battery, and, for example, may monitor a state of the battery, maintain an optimal condition for an operation of the battery, predict a replacement timing of the battery, detect a fault of the battery, generate a control signal or a command signal associated with the battery, and control the state or the operation of the battery.

The battery includes a charger or a secondary cell configured to store power by charging, and a device including the battery supplies the power from the battery to a load. The load is an entity that consumes the power and may consume a power supplied from an outside. The load includes, for example, an electric heater, an electric lamp and a motor of an electric vehicle (EV), that consume power using a circuit in which current flow at a predetermined voltage.

In operation 202, the battery charging apparatus determines charging steps, for example, charging steps #S1, #S2 and #S3 of FIG. 1, for charging of the battery, by analyzing the curve 101. For example, the battery charging apparatus divides or segments the curve 101 based on a shape of the curve 101 and determines charging steps #S1 through #S3 based on regions into which the curve 101 is divided. The battery charging apparatus detects peaks on the curve 101 and determines the charging steps #S1 through #S3 based on the detected peaks over a predetermined time period or voltage. The battery charging apparatus determines the number of charging steps based on a number of the detected peaks and determines the charging steps #S1 through #S3 corresponding to the determined number of charging steps. Examples of determining the charging steps #S1 through #S3 will be further described below.

In operation 203, the battery charging apparatus generates a charging profile 102 including charging currents for each of the charging steps. The charging profile 102 is expressed as a sequence of charging currents for each of the charging steps #S1 through #S3, and the charging steps #S1 through #S3 is expressed respectively by ranges based on a SOC or voltage. For example, the charging profile 102 is expressed by sequences of operations of charging the battery with a current I1 in a SOC or voltage ranging from "0" to "A" at the charging step #S1, charging the battery with a current I2 in a SOC or voltage ranging from "A" to "B" at the charging step #S2, and charging the battery with a current I3 in an SOC or voltage ranging from "B" to "C" at the charging step #S3. In this example, a charging current is variously expressed by ampere (A), milliampere (mA), or a C-rate. The C-rate is a battery-related characteristic indicating a rate of current for charging and discharging of a battery based on rated capacity of the battery. For example, when a battery has a capacity of 1,000 milliampere-hour (mAh) that is an amount of current to be used for 1 hour, and when current for charging and discharging is 1 A, the c-rate is represented by "1 C=1 A/1,000 mAh." Accordingly, the charging profile 102 is expressed as a sequence of C-rates for each of the charging steps #S1 through #S3. An example of generating of the charging profile 102 will be further described below.

Figure 3:
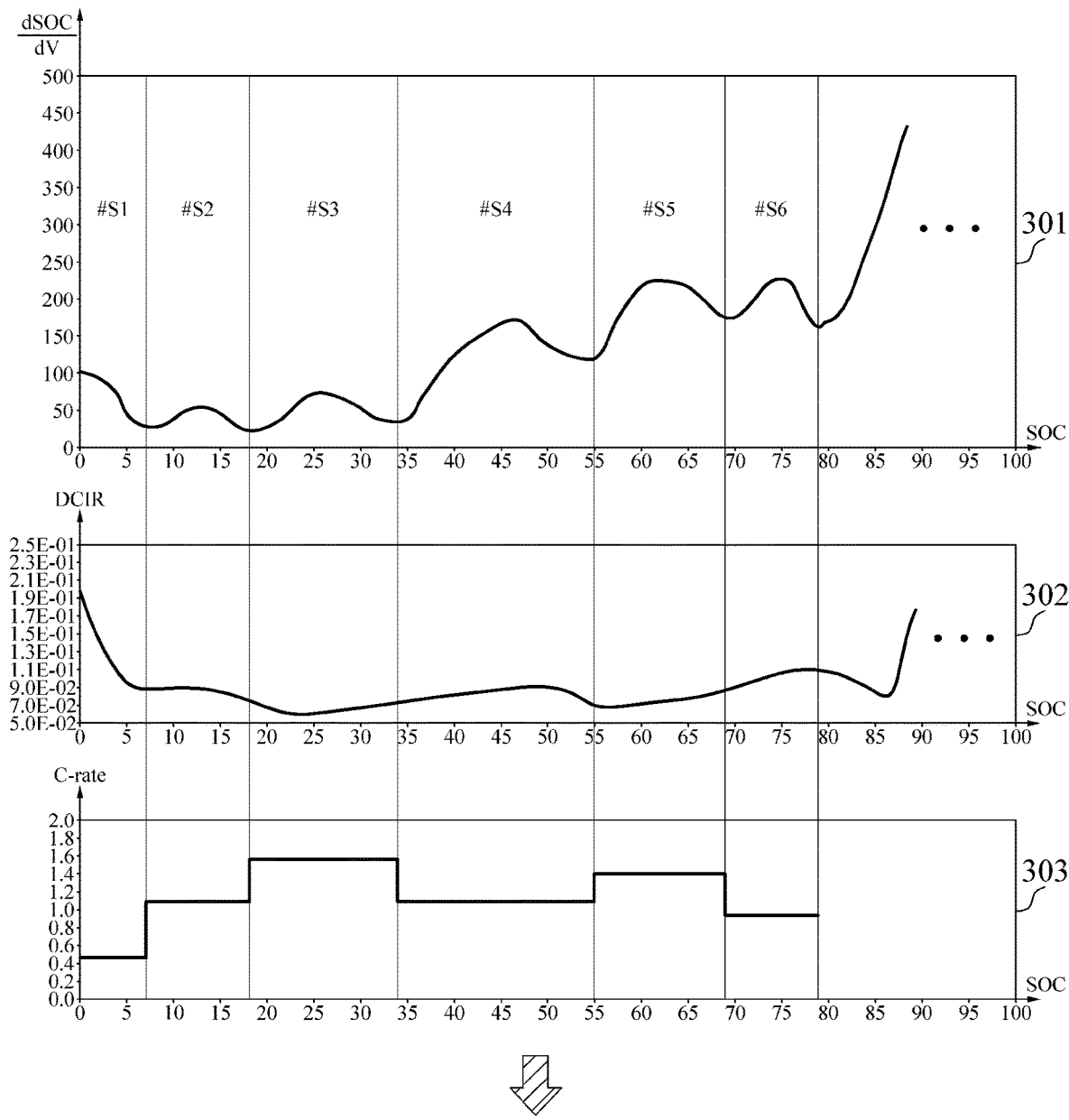
FIG. 3 illustrates an example of an operation of generating a charging profile.

FIG. 3 illustrates an example of an operation of generating a charging profile.

Referring to FIG. 3, a battery charging apparatus analyzes a curve 301 and determines charging steps, for example, charging steps #S1, #S2, #S3, #S4, #S5 and #S6. In FIG. 3, a horizontal axis of the curve 301 represents a SOC, and a vertical axis of the curve 301 represents dSOC/dV. Information included in the curve 301 is expressed by a function or a correspondence relationship between the SOC and the dSOC/dV that change in response to charging of a battery.

The battery charging apparatus divides the curve 301 based on the main electrochemical reactions that change in response to the battery being charged. For example, when the battery is charged, electrochemical reactions occur complexly. In this example, the battery charging apparatus determines a SOC range corresponding to a main electrochemical reaction among electrochemical reactions from the curve 301 based on a shape of the curve 301. As described above, the main electrochemical reaction is a dominant electrochemical reaction among electrochemical reactions that occur in response to the battery being charged. Main electrochemical reactions are expressed by a predetermined pattern on the curve 301. Patterns of the main electrochemical reactions on the curve 301 are acquired experimentally or through simulation. The battery charging apparatus may acquire the patterns of the main electrochemical reactions on the curve 301 and identify portions of the curve 301 corresponding to the main electrochemical reactions.

The battery charging apparatus identifies SOC ranges corresponding to the main electrochemical reactions on the curve 301 and divides the curve 301 based on the identified SOC ranges. The battery charging apparatus determines the charging steps #S1 through #S6 based on the SOC ranges identified to divide the curve 301. An example of analyzing the curve 301 will be described below with reference to FIGS. 4A and 4B.

The battery charging apparatus determines charging current ratios for each of the charging steps #S1 through #S6 based on electrochemical characteristics corresponding to the charging steps #S1 through #S6. For example, an electrochemical characteristic corresponding to a predetermined charging step is expressed by an impedance corresponding to a main electrochemical reaction of the charging step.

The battery charging apparatus acquires impedances for each of the charging steps #S1 through #S6 based on main electrochemical reactions corresponding to the charging steps #S1 through #S6. The battery charging apparatus determines the charging current ratios for each of the charging steps #S1 through #S6 based on the acquired impedances.

In an example, the battery charging apparatus estimates impedances by performing electrical impedance spectroscopy (EIS) analysis for each of the charging steps #S1 through #S6. In another example, the battery charging apparatus estimates impedances for each of the charging steps #S1 through #S6 based on direct current internal resistances (DCIRs) corresponding to the charging steps #S1 through #S6. Referring to FIG. 3, the battery charging apparatus acquires DCIRs 302 corresponding to the charging steps #S1 through #S6, and impedances for each of the charging steps #S1 through #S6 are expressed by the DCIRs 302.

The battery charging apparatus determines the charging current ratios for each of the charging steps #S1 through #S6 based on the impedances for each of the charging steps #S1 through #S6. For example, the battery charging apparatus sets a charging current ratio to decrease in response to an impedance increasing and determines the charging current ratios for each of the charging steps #S1 through #S6. The battery charging apparatus uses electrochemical characteristics (for example, impedances) corresponding to the charging steps #S1 through #S6 to determine the charging current ratios, and thus it is possible to prevent degradation of the battery while shortening an amount of time to charge the battery.

The battery charging apparatus determines charging currents for each of the charging steps #S1 through #S6 based on the charging current ratios for each of the charging steps #S1 through #S6 and generates charging profiles 303 and 304. The battery charging apparatus acquires a charging condition that includes a required charging time, a required amount of charge and at least one internal state limit condition. The battery charging apparatus initializes the charging currents for each of the charging steps #S1 through #S6 based on the required amount of charge and the required charging time.

The battery charging apparatus adjusts the initialized charging currents based on the charging current ratios for each of the charging steps #S1 through #S6. For example, the battery charging apparatus acquires representative DCIRs corresponding to the charging steps #S1 through #S6 and sets a charging current ratio to decrease in response to a representative DCIR increasing, to adjust the charging currents. The representative DCIR is calculated by various statistical techniques, for example, a representative value or an average of DCIRs corresponding to SOC ranges. The battery charging apparatus optimizes the charging currents for each of the charging steps #S1 through #S6 based on the internal state limit condition. The battery charging apparatus generates the charging profiles 303 and 304 that include the optimized charging currents. An example of an operation of optimizing charging currents based on an internal state limit condition will be described below.

Although the horizontal axis and the vertical axis of the curve 301 represent the SOC and the dSOC/dV, respectively, as shown in FIG. 3, the example is not limited thereto. For example, the horizontal axis and the vertical axis represent a voltage V and dQ/dV, respectively, as described above.

Figure 4A:
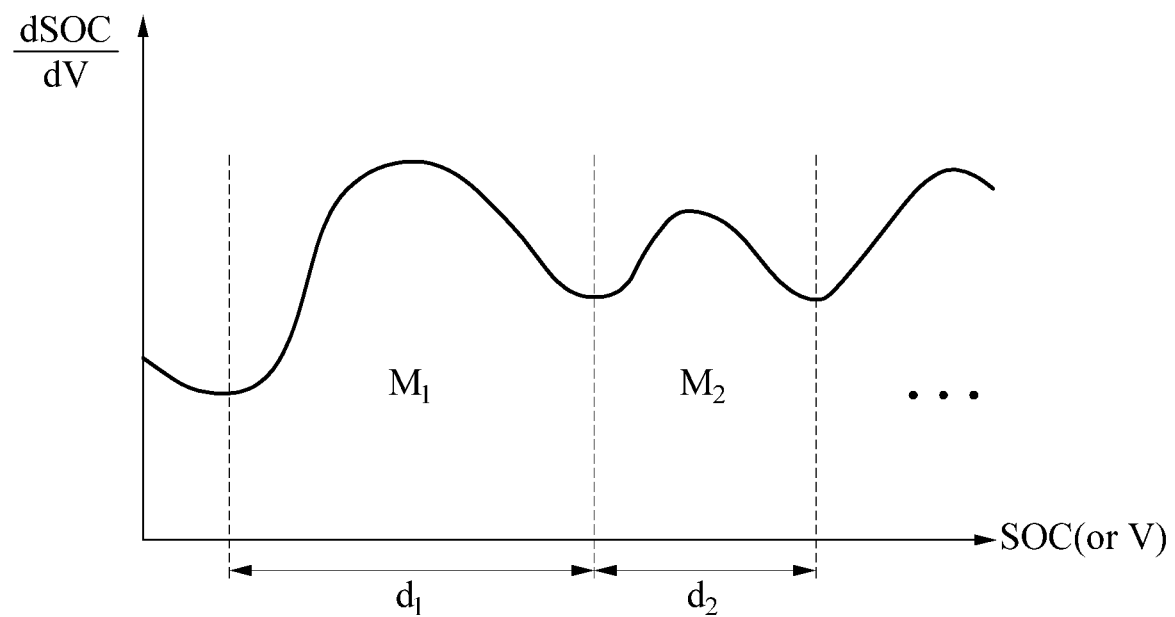
FIGS. 4A and 4B illustrate examples of an operation of determining charging steps.

FIG. 4A illustrates an example of an operation of determining charging steps.

Referring to FIG. 4A, a main electrochemical reaction among electrochemical reactions that occur in response to a battery being charged is expressed as a SOC or voltage range corresponding to a convex portion of a curve representing dSOC/dV. Because dominant electrochemical reactions respectively correspond to convex portions of the curve representing dSOC/dV, electrochemical characteristics change based on corresponding SOC or voltage ranges. The battery charging apparatus identifies SOC or voltage ranges corresponding to convex portions of the curve representing dSOC/dV, and divides the curve based on the identified SOC or voltage ranges. For example, the battery charging apparatus identifies regions $M_1$ and $M_2$ in which dSOC/dV changes from increasing to decreasing and divides the curve based on SOC or voltage ranges $d_1$ and $d_2$ corresponding to the identified regions $M_1$ and $M_2$. The battery charging apparatus determines charging steps for each of the SOC or voltage ranges $d_1$ and $d_2$.

Referring to FIG. 4A, the battery charging apparatus identifies regions (for example, $M_1$ and $M_2$) in which dSOC/dV changes from an increasing slope to a decreasing slope and determines the number of charging steps based on the number of the identified regions. The battery charging apparatus determines charging steps corresponding to the number of charging steps. The battery charging apparatus determines the number of charging steps by analyzing the curve, initializes ranges corresponding to the charging steps, and adjusts the ranges based on an internal state of the battery.

Figure 4B:
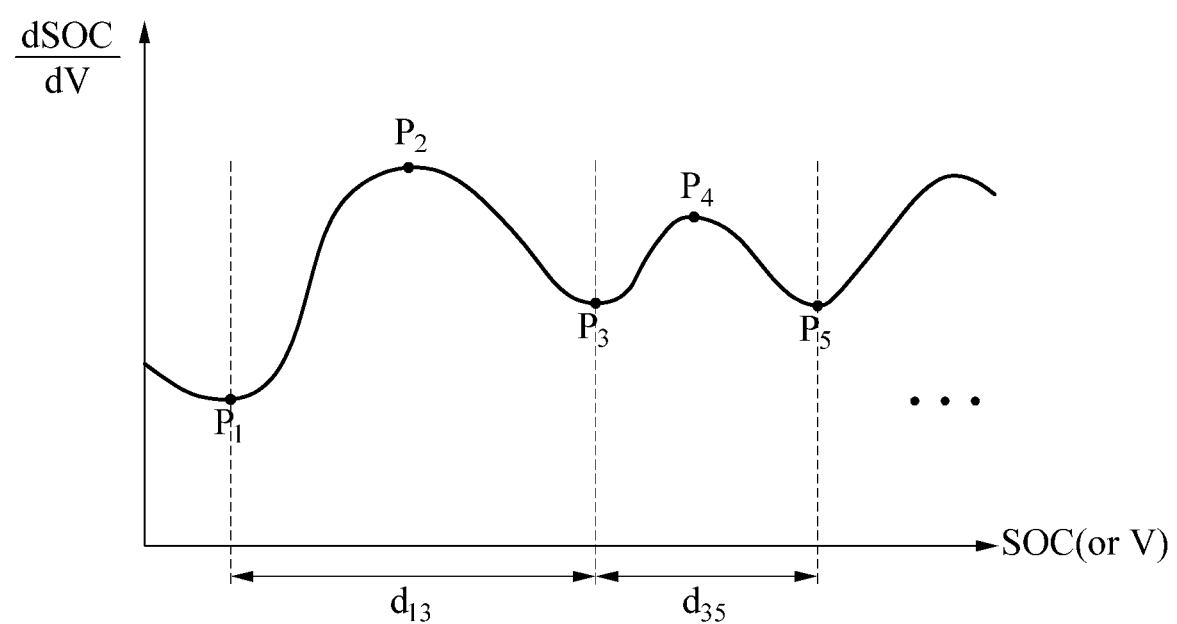

FIG. 4B illustrates another example of an operation of determining charging steps.

Referring to FIG. 4B, a main electrochemical reaction among electrochemical reactions that occur in response to a battery being charged is expressed based on peaks, for example, peaks $P_1$, $P_2$, $P_3$, $P_4$, and $P_5$, on a curve. Peaks $P_2$ and $P_4$ at which dSOC/dV changes from an increasing slope to a decreasing slope are positive peaks, and peaks $P_1$, $P_3$, and $P_5$ at which dSOC/dV changes from a decreasing slope to an increasing slope are negative peaks. The battery charging apparatus detects the peaks on the curve and determines charging steps based on the detected peaks. For example, the battery charging apparatus divides the curve based on the negative peaks $P_1$, $P_3$, and $P_5$, and determines charging steps based on SOC or voltage ranges $d_{13}$ and $d_{35}$ for a division of the curve. The battery charging apparatus sequentially detects the negative peaks $P_1$, $P_3$, and $P_5$, and determines a SOC or voltage corresponding to a start and an end of a charging step based on the detected negative peaks $P_1$, $P_3$, and $P_5$. The battery charging apparatus determines a SOC or voltage range corresponding to the charging step based on the determined SOC or voltage.

Referring to FIG. 4B, the battery charging apparatus determines the number of charging steps based on detected peaks, for example, peaks $P_1$, $P_2$, $P_3$, $P_4$, and $P_5$, of the curve, or a number of the peaks on the curve. The battery charging apparatus determines charging steps corresponding to the number of charging steps. For example, the battery charging apparatus determines the number of charging steps based on a number of negative peaks. The battery charging apparatus determines the number of charging steps, initializes ranges corresponding to the charging steps, and adjusts the ranges based on an internal state of the battery.

However, a scheme of identifying dominant electrochemical reactions by analyzing a curve is not limited to the examples of FIGS. 4A and 4B, and various schemes may be applied. As described above, a vertical axis of each of the curves of FIGS. 4A and 4B represent dQ/dV.

Figure 5:
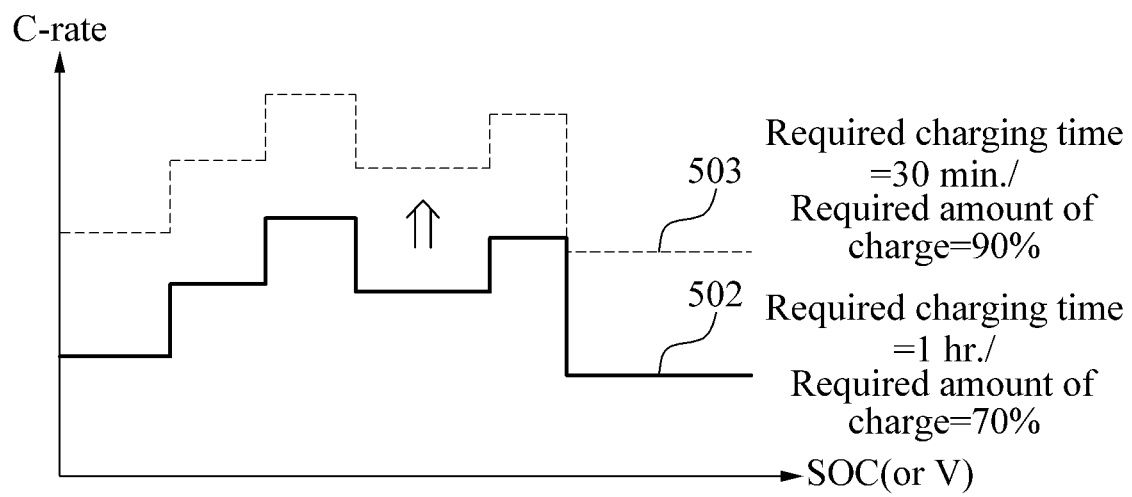
FIGS. 5, 6A, 6B, 7 and 8 illustrate examples of operations of generating charging profiles.

FIG. 5 illustrates an example of an operation of generating a charging profile.

Referring to FIG. 5, a battery charging apparatus generates charging profiles 502 and 503 based on charging current ratios 501 corresponding to charging steps #$S_1$ through #$S_N$. The battery charging apparatus determines whether completion of charging corresponding to a required amount of charge within a required charging time is possible. When the completion of the charging is determined to be possible, the battery charging apparatus generates the charging profiles 502 and 503.

The battery charging apparatus generates the charging profiles 502 and 503 corresponding to the charging current ratios 501, based on the required charging time and the required amount of charge. As described above, the battery charging apparatus initializes charging currents based on the required charging time and the required amount of charge and generates the charging profiles 502 and 503 based on the initialized charging currents and the charging current ratios 501. Charging currents in a charging profile increase when the required charging time decreases, and decrease when the required charging time increases. Also, the charging currents decrease when the required amount of charge decreases, and increase when the required amount of charge increases. The battery charging apparatus generates the charging profiles 502 and 503 based on the required charging time and the required amount of charge as well as the charging current ratios 501, and accordingly, C-rates of the charging profile 503 are determined to be greater than C-rates of the charging profile 502.

Figure 6A:
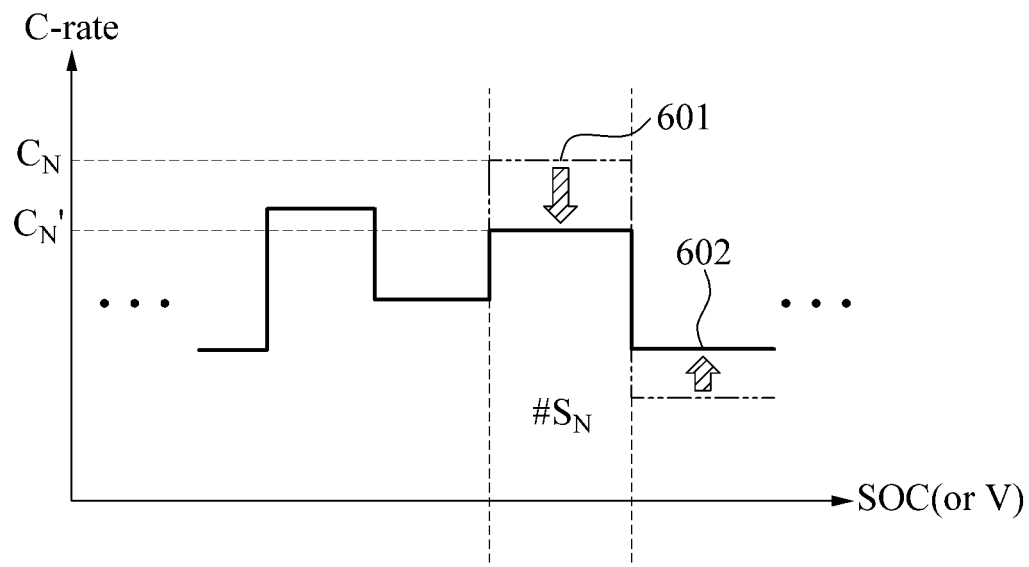

FIG. 6A illustrates another example of an operation of generating a charging profile.

A battery charging apparatus acquires a charging condition including a required charging time, a required amount of charge and at least one internal state limit condition. The battery charging apparatus determines charging currents for each of charging steps from an electrochemical model based on charging current ratios and the charging condition.

A battery includes an electrolyte, a separator, a collector and two electrodes (for example, an anode and a cathode). Lithium ions (Li+) are intercalated into or de-intercalated from the two electrodes. The electrolyte is a medium for movements of lithium ions (Li$^+$). The separator physically separates the cathode from the anode to prevent electrons from directly flowing and to allow ions to pass. The collector collects electrons generated by an electrochemical reaction or supplies electrons for the electrochemical reaction. Each of the cathode and the anode includes an active material. For example, lithium cobalt oxide ($LiCoO_2$) is used as an active material of the cathode, and graphite ($C_6$) is used as an active material of the anode. During charging of the battery, lithium ions (Li+) move from the cathode to the anode. During discharging of the battery, lithium ions (Li+) move from the anode to the cathode. Thus, a concentration of lithium ions (Li+) included in the active material of the cathode, and a concentration of lithium ions (Li+) included in the active material of the anode vary depending on the charging and discharging.

To express an internal state of the battery, an electrochemical model is employed using various schemes. For example, various application models, including a single particle model (SPM), are employed as an electrochemical model. Also, parameters that define the electrochemical model are variously modified depending on various examples. The internal state limit condition is derived from the electrochemical model of the battery or is experimentally or heuristically derived. Various schemes are used to define an internal state limit condition.

The internal state limit condition is defined from an electrochemical model based on at least one internal state that influences the degradation of the battery. The internal state limit condition includes, for example, any one or any combination of an anode overpotential condition, a cathode overpotential condition, an anode active material surface lithium ion concentration condition, a cathode active material surface lithium ion concentration condition, a cell voltage condition and a SOC condition of the battery. An overpotential is a difference between an electrode potential that changes when current flows and an equilibrium potential that is associated with intercalation/de-intercalation reactions at each electrode of the battery. A lithium ion concentration is a concentration of lithium ions (Li+) used as a material in an active material of each electrode of the battery, and materials other than the lithium ions are used as a material in the active material.

When an internal state of the battery reaches one of the internal state limit conditions in response to the battery being charged, the battery may degrade. The battery charging apparatus controls the charging of the battery or generates a charging profile based on the internal state limit conditions. For example, when it is determined that the battery is degraded when an anode overpotential of the battery falls below 0.05 V, an anode overpotential condition is defined by an overpotential value based on 0.05 V. However, the internal state limit condition is not limited to the above examples, and various expressions that quantify an internal state having an influence on a degradation of the battery may be used.

The battery charging apparatus initializes the charging currents for each of the charging steps corresponding to the charging current ratios based on the required charging time and the required amount of charge. The initialized charging currents are referred to as "initial charging currents." The battery charging apparatus estimates at least one internal state of the battery to which the initial charging currents are applied, for each of the charging steps, using the electrochemical model.

The battery charging apparatus adjusts the initial charging currents based on whether the estimated internal state reaches at least one internal state limit condition for each of the charging steps, and determines charging currents for each of the charging steps. To prevent the degradation of the battery while completing the charging of the battery with the required amount of charge during the required charging time, the battery charging apparatus repeatedly adjusts and optimizes the charging currents corresponding to the charging current ratios based on the internal state limit condition.

The battery charging apparatus estimates at least one internal state of the battery to which the initial charging currents are applied for each of the charging steps based on the electrochemical model. The battery charging apparatus determines whether the internal state estimated for each of the charging steps reaches the internal state limit condition, and optimizes the initial charging currents based on a determination result.

Referring to FIG. 6A, the battery charging apparatus optimizes a charging profile 601 including the initial charging currents by adjusting the initial charging currents and generates a charging profile 602 based on an optimization result. The battery charging apparatus determines that an internal state corresponding to a charging step #$S_N$ reaches the internal state limit condition, and reduces an initial charging current corresponding to the charging step #$S_N$ based on a determination result. To complete the charging of the battery with the required amount of charge during the required charging time, the battery charging apparatus increases an initial charging current corresponding to a second charging step distinguished from the charging step #$S_N$ until an internal state corresponding to the second charging step reaches the internal state limit condition.

Figure 6B:
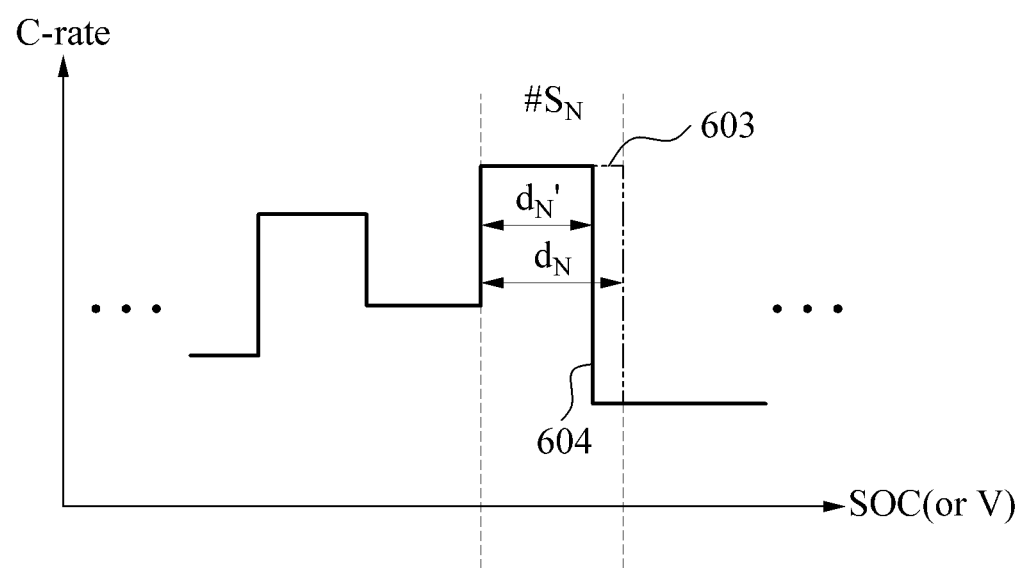

FIG. 6B illustrates another example of an operation of generating a charging profile.

Referring to FIG. 6B, a battery charging apparatus adjusts ranges for each of charging steps based on a charging condition. The battery charging apparatus optimizes a charging profile 603 by adjusting the ranges for each of the charging steps and generates a charging profile 604 based on an optimization result. The battery charging apparatus determines that an internal state corresponding to a charging step #$S_N$ reaches an internal state limit condition, and reduces a range corresponding to the charging step #$S_N$ based on a determination result. To complete charging of a battery with a required amount of charge during a required charging time, the battery charging apparatus increases a range corresponding to a second charging step distinguished from the charging step #$S_N$ until an internal state corresponding to the second charging step reaches an internal state limit condition.

Figure 7:
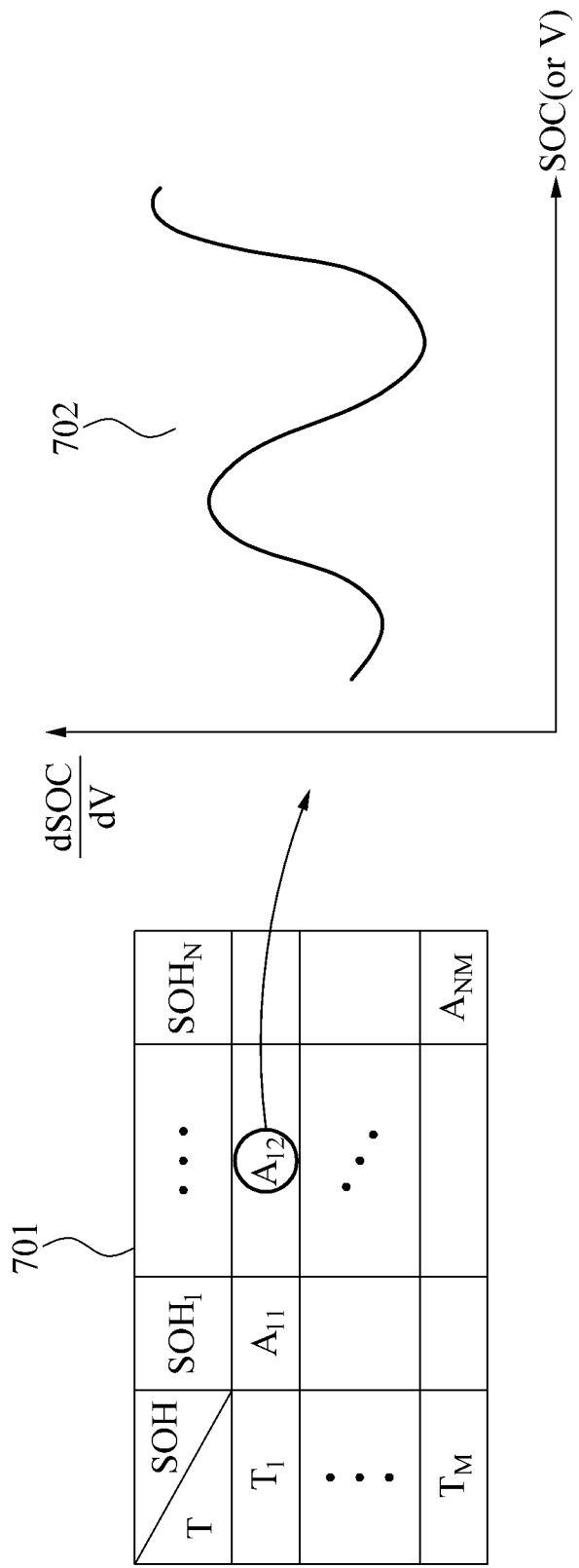

FIG. 7 illustrates another example of an operation of generating a charging profile.

Referring to FIG. 7, curves 701 representing a differential value of a SOC or a quantity of electricity with respect to a voltage of a battery based on the voltage (or a SOC) are mapped to SOHs and temperatures of the battery to construct a database. A battery charging apparatus acquires a curve 702 corresponding to a battery that is to be charged among the curves 701 corresponding to the SOHs and the temperatures.

The battery charging apparatus acquires a SOH and a temperature of a battery that is to be charged. The battery charging apparatus estimates or measures the SOH and the temperature of the battery, and various schemes may be used to estimate or measure a SOH and a temperature of a battery. The battery charging apparatus acquires the curve 702 based on the acquired SOH and the acquired temperature. The battery charging apparatus acquires a current and a voltage of the battery that is to be charged and acquires the curve 702 corresponding to the battery based on the acquired current and the acquired voltage. The battery charging apparatus generates a charging profile based on the curve 702.

Figure 8:
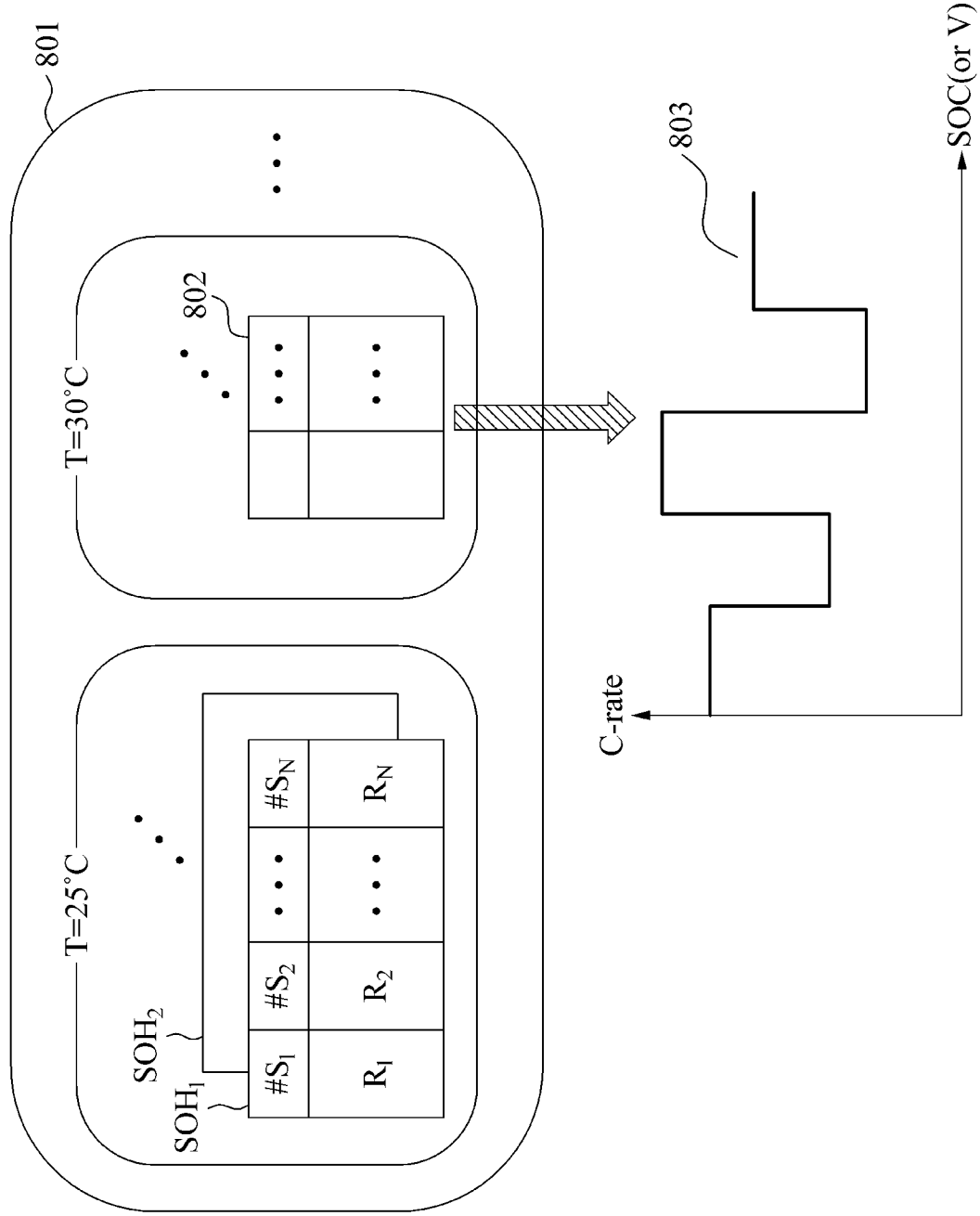

FIG. 8 illustrates another example of an operation of generating a charging profile.

Referring to FIG. 8, charging current ratio sets 801 for a generation of a charging profile of a battery are mapped to SOHs and temperatures of the battery to construct a database. The charging current ratio sets 801 are mapped to the SOHs and the temperatures of the battery based on an analysis result of curves that represent a differential value of a SOC (or a quantity of electricity) with respect to a voltage of the battery based on the voltage (or the SOC). The battery charging apparatus acquires a charging current ratio set 802 corresponding to a battery that is to be charged among the charging current ratio sets 801 corresponding to the SOHs and the temperatures of the battery.

For example, the battery charging apparatus acquires a SOH and a temperature of a battery that is to be charged. The battery charging apparatus acquires the charging current ratio set 802 based on the acquired SOH and the acquired temperature. The battery charging apparatus acquires a current and a voltage of the battery and acquires the charging current ratio set 802 corresponding to the battery based on the acquired current and the acquired voltage. The battery charging apparatus generates a charging profile 803 based on the charging current ratio set 802.

Figure 9:
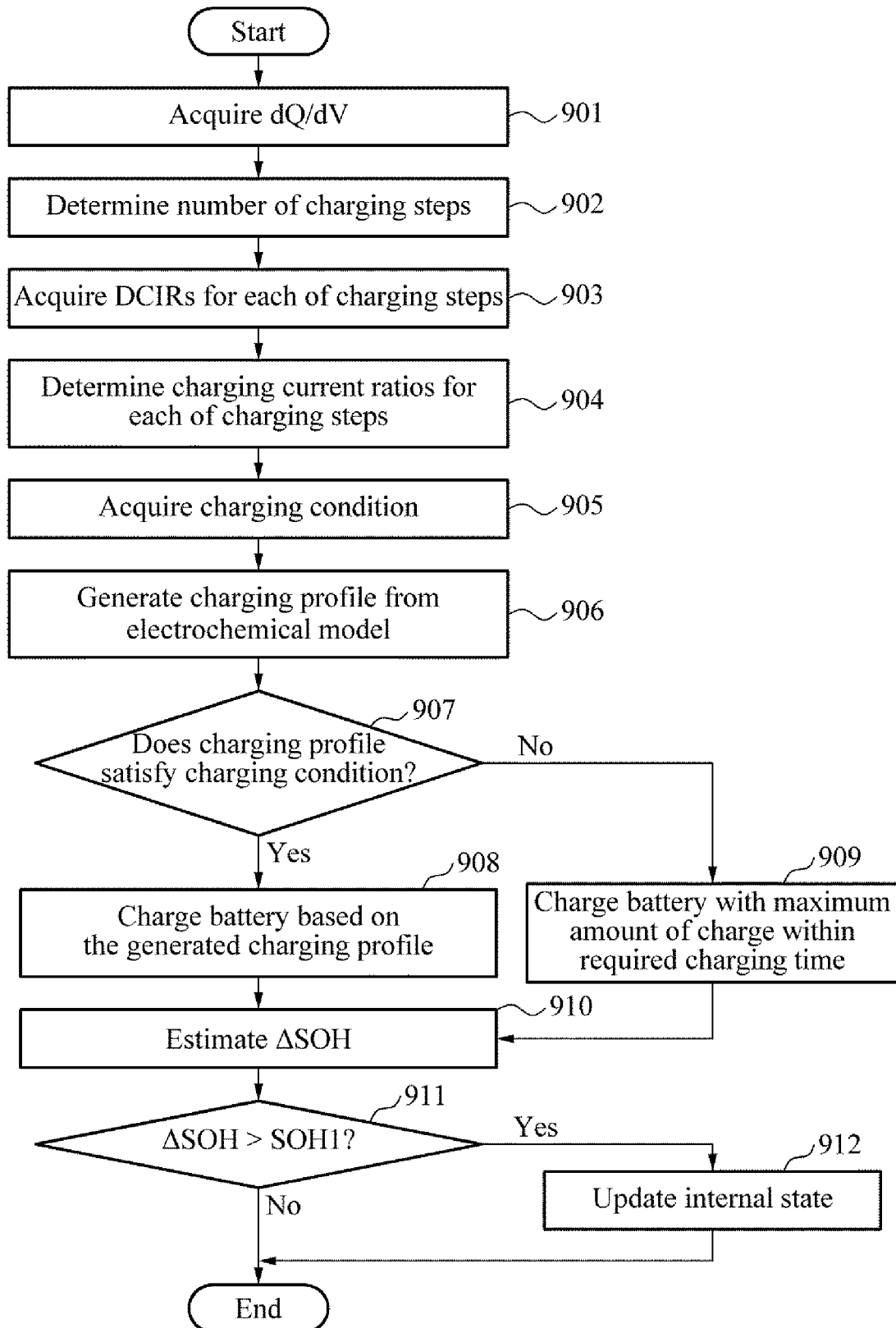
FIG. 9 is a flowchart illustrating an example of a battery charging method.

FIG. 9 is a flowchart illustrating another example of a battery charging method.

Referring to FIG. 9, in operation 901, a battery charging apparatus acquires a differential value of a SOC or a quantity of electricity with respect to a voltage or the SOC of a battery. The battery charging apparatus acquires dQ/dV or dSOC/dV as the above-described curve or the above-described correspondence relationship.

In operation 902, the battery charging apparatus determines the number of charging steps based on acquired information. As described above, the battery charging apparatus analyzes a curve and determines ranges corresponding to the charging steps or the number of charging steps.

In operation 903, the battery charging apparatus acquires DCIRs for each of the charging steps. In operation 904, the battery charging apparatus acquires charging current ratios for each of the charging steps based on the DCIRs acquired for each of the charging steps. In operation 905, the battery charging apparatus acquires a charging condition including a required charging time, a required amount of charge and at least one internal state limit condition. In operation 906, the battery charging apparatus generates a charging profile from an electrochemical model.

In operation 907, the battery charging apparatus determines whether the generated charging profile satisfies the charging condition. The battery charging apparatus determines whether internal states for each of the charging steps reach internal state limit conditions, based on the generated charging profile. The battery charging apparatus determines whether charging of the battery with the required amount of charge within the required charging time is possible, based on the generated charging profile.

In an example, when the generated charging profile is determined to satisfy the charging condition, the battery charging apparatus charges the battery based on the generated charging profile in operation 908. The battery charging apparatus estimates an internal state of the battery using an electrochemical model in response to the battery being charged and adjusts charging currents or the ranges corresponding to the charging steps based on the estimated internal state and the internal state limit condition.

In another example, when the generated charging profile is determined not to satisfy the charging condition, the battery charging apparatus charges the battery with a maximum amount of charge within the required charging time in operation 909. In this example, the battery is charged by an amount of charge that is less than the required amount of charge. For example, the battery charging apparatus sends a request for a re-input of at least one of the required charging time and the required amount of charge. The battery charging apparatus repeats an operation of generating a charging profile based on required charging time and a required amount of charge that is received based on the request, and of determining whether the generated charging profile satisfies the charging condition.

In operation 910, the battery charging apparatus estimates a variation ΔSOH in a SOH of the battery by charging the battery. The battery charging apparatus estimates the internal state of the battery as well as the SOH of the battery during charging of the battery.

In operation 911, the battery charging apparatus determines whether the variation ΔSOH is greater than SOH1.

When the variation ΔSOH is determined to be greater than SOH1, the battery charging apparatus updates the internal state of the battery in operation 912. SOH1 is a threshold used as a reference value of updating the internal state of the battery. The updated internal state is used to generate a charging profile of the battery.

Figure 10:
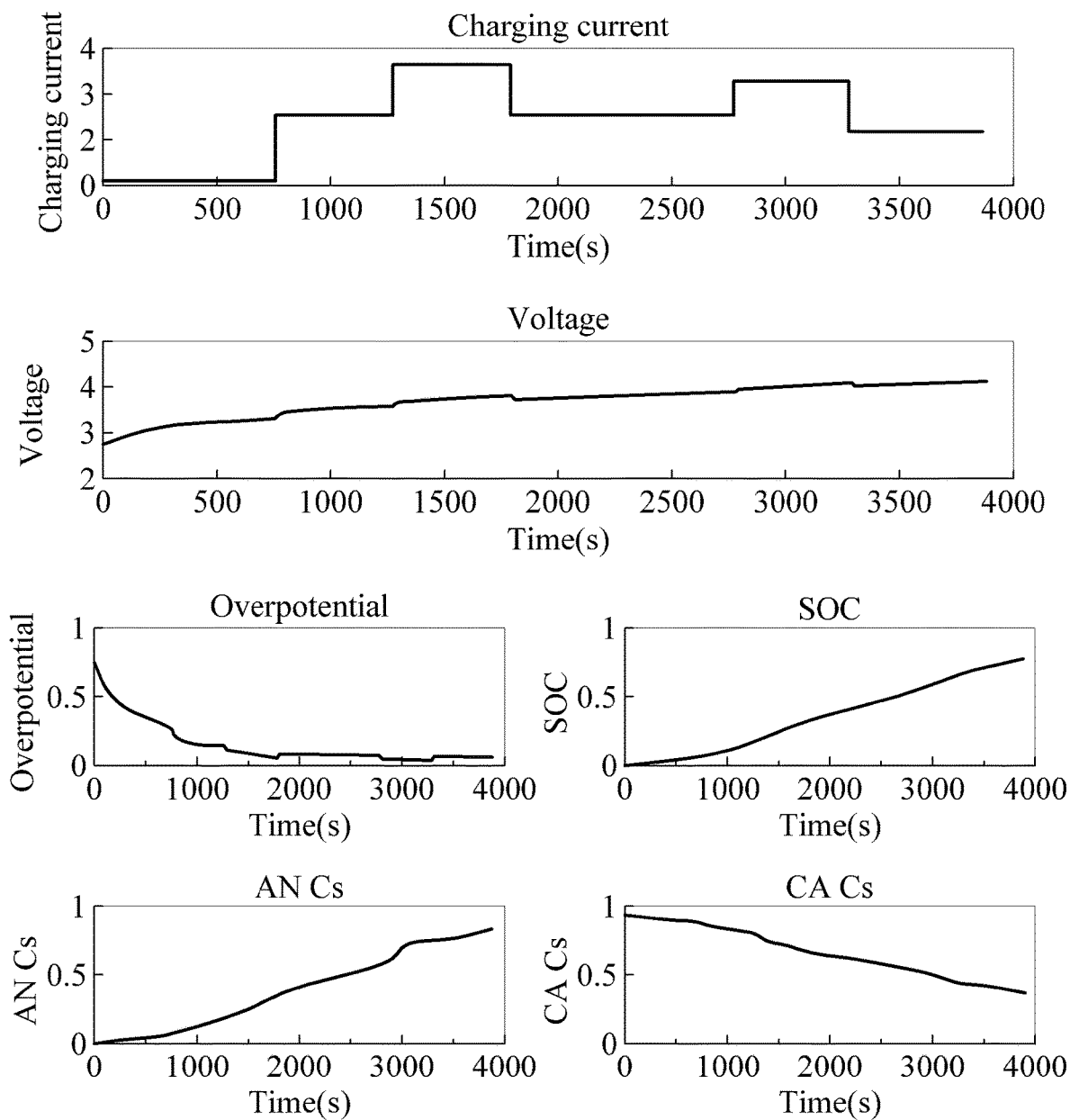
FIG. 10 illustrates an example of a charging profile and an internal state of a battery.

FIG. 10 illustrates an example of a charging profile and an internal state of a battery.

Referring to FIG. 10, a battery charging apparatus charges a battery using a charging profile based on the above-described method and estimates an internal state of the battery based on the charging of the battery. For example, the battery charging apparatus estimates a voltage, an overpotential, a SOC, an anode lithium ion concentration and a cathode lithium ion concentration of the battery. The battery charging apparatus controls the charging of the battery based on the estimated internal state and a charging limit condition.

FIG. 11 illustrates an example of an operation of a battery charging apparatus 1101.

Referring to FIG. 11, the battery charging apparatus 1101 includes one or more processors configured to control the charging of a battery 1102 of a vehicle. The battery charging apparatus 1101 estimates a state of the battery 1102 using an estimator 1103 and controls the charging of the battery 1102 using a BMS 1104. The battery charging apparatus 1101 provides a user interface for the charging of the battery 1102 using a display 1105. For example, the battery charging apparatus 1101 acquires a required charging time based on an input through the user interface. The battery charging apparatus 1101 displays, using the display 1105, information associated with the charging of the battery 1102.

Figure 12:
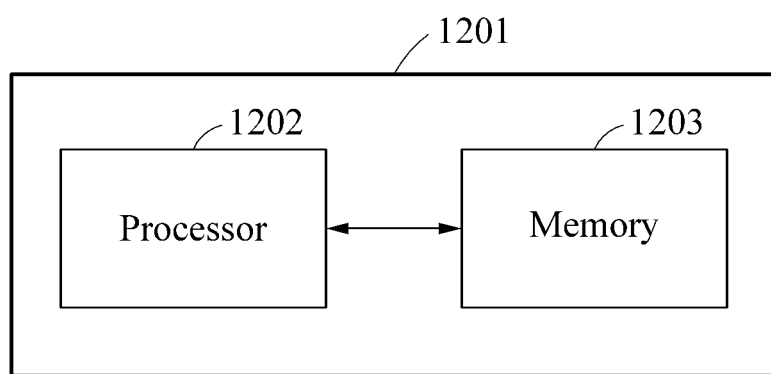
FIG. 12 is a block diagram illustrating an example of a configuration of a battery charging apparatus.

FIG. 12 illustrates an example of a configuration of a battery charging apparatus 1201.

Referring to FIG. 12, the battery charging apparatus 1201 includes a processor 1202 and a memory 1203. The processor 1202 may include one or more of the apparatuses described with FIGS. 1 through 11, or may perform one or more of the methods described with FIGS. 1 through 11. The memory 1203 stores a program in which a battery charging method is implemented, and information used to generate a charging profile. The memory 1203 is, for example, a volatile memory or a nonvolatile memory.

The processor 1202 executes the program and controls the battery charging apparatus 1201. A code of the program executed by the processor 1202 is stored in the memory 1203. The battery charging apparatus 1201 may be connected to an external device, for example, a personal computer (PC) or a network, through an input/output (I/O) device (not shown) and may exchange data.

The battery charging apparatuses 1101, the estimator 1103, the BMS 1104, the display 1105, the apparatus 1201, the processor 1202, and the memory 1203 described herein with respect to FIGS. 1-12 are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A processor-implemented battery charging method comprising:

acquiring a functional relationship of a differential value of an amount of charge or a state of charge (SOC) with respect to a voltage of a battery based on the voltage or the SOC;

determining charging steps for charging of the battery and a charging current associated with each of the charging steps by analyzing the functional relationship; and generating a charging profile comprising the respective charging current for each of the charging steps to charge the battery, wherein the generating of the charging profile comprises:

determining charging current ratios for each of the charging steps based on electrochemical characteristics corresponding to the charging steps; and determining the respective charging current for each of the charging steps based on the charging current ratios.

2. The battery charging method of claim 1, wherein the functional relationship represents a correspondence relationship between the voltage or the SOC that increases in response to the battery being charged and the differential value that changes in response to the battery being charged.

3. The battery charging method of claim 1, wherein a horizontal axis of the functional relationship represents the voltage that increases in response to the battery being charged or the SOC mapped to the voltage that increases in response to the battery being charged, and a vertical axis of the functional relationship represents the differential value that changes in response to the battery being charged.

4. The battery charging method of claim 1, wherein the determining of the charging steps comprises:

segmenting the functional relationship based on changes in main electrochemical reactions in response to the battery being charged; and determining the charging steps based on regions into which the functional relationship is segmented, and the main electrochemical reactions are determined based on a number of electrochemical reactions occurring in response to the battery being charged.

5. The battery charging method of claim 1, wherein the determining of the charging steps comprises:

segmenting the functional relationship based on ranges in which the differential value changes from increasing to decreasing; and determining the charging steps based on the ranges.

6. The battery charging method of claim 1, wherein the determining of the charging steps comprises:

detecting at least one peak on the functional relationship; and determining the charging steps based on the detected peak.

7. The battery charging method of claim 6, wherein the determining of the charging steps based on the detected peak comprises:

determining a first SOC or a first voltage corresponding to a start of a first charging step based on a first negative peak on the functional relationship; and determining a second SOC or a second voltage corresponding to an end of the first charging step and a start of a second charging step based on a second negative peak detected subsequent to the first negative peak, and the first negative peak and the second negative peak are points at which the differential value changes from decreasing to increasing.

8. The battery charging method of claim 6, wherein the determining of the charging steps based on the detected peak comprises:

determining a number of charging steps based on the detected peak; and determining charging steps corresponding to the number of charging steps.

9. The battery charging method of claim 1, wherein the determining of the charging current ratios comprises:

acquiring impedances for each of the charging steps based on main electrochemical reactions corresponding to the charging steps; and determining the charging current ratios for each of the charging steps based on the impedances.

10. The battery charging method of claim 9, wherein the determining of the charging current ratios comprises setting a charging current ratio to decrease in response to an impedance increasing.

11. The battery charging method of claim 9, wherein the acquiring of the impedances comprises at least one of:

estimating impedances by performing an electrical impedance spectroscopy (EIS) analysis for each of the charging steps; and estimating impedances based on direct current internal resistances (DCIRs) corresponding to the charging steps.

12. The battery charging method of claim 1, wherein the determining of the charging currents comprises:

acquiring a charging condition comprising a required charging time, a required amount of charge and at least one internal state limit condition; and determining the respective charging current for each of the charging steps from an electrochemical model based on the charging condition and the charging current ratios.

13. The battery charging method of claim 12, wherein the determining of the charging currents from the electrochemical model comprises:

determining initial charging currents for each of the charging steps corresponding to the charging current ratios, based on the required charging time and the required amount of charge;

estimating at least one internal state of the battery to which the initial charging currents are applied, for each of the charging steps, using the electrochemical model; and adjusting the initial charging currents based on whether the estimated internal state reaches at least one internal state limit condition for each of the charging steps, and determining the respective charging current for each of the charging steps.

14. The battery charging method of claim 12, wherein the determining of the charging currents from the electrochemical model comprises adjusting ranges for each of the charging steps based on the charging condition and the charging current ratios.

15. The battery charging method of claim 12, wherein the internal state limit condition comprises any one or any combination of any two or more of an anode overpotential condition, a cathode overpotential condition, an anode active material surface lithium ion concentration condition, a cathode active material surface lithium ion concentration condition, a cell voltage condition and an SOC condition.

16. The battery charging method of claim 1, wherein the acquiring of the functional relationship comprises:

acquiring at least one of a temperature and a state of health (SOH) of the battery; and acquiring the functional relationship based on at least one of the acquired temperature and the acquired SOH.

17. A processor-implemented battery charging method comprising:
- determining charging steps for each of main electrochemical reactions changes in response to a battery being charged;
- determining charging current ratios for each of the charging steps based on electrochemical characteristics corresponding to the charging steps; and
- generating a charging profile comprising charging currents for each of the charging steps based on the charging current ratios.

18. A non-transitory computer-readable storage medium storing instructions that, when executed by a processor, cause the processor to perform the battery charging method of claim 1.

19. A battery charging apparatus comprising:
a processor configured to:
- acquire a functional relationship of a differential value of an amount of charge or a state of charge (SOC) with respect to a voltage of a battery based on the voltage or the SOC;
- determine charging steps for charging of the battery and a charging current associated with each of the charging steps by analyzing the functional relationship;
- determine charging current ratios for each of the charging steps based on electrochemical characteristics corresponding to the charging steps; and
- determine the respective charging current for each of the charging steps based on the charging current ratios; and
- generate a charging profile comprising the respective charging current for each of the charging steps to charge the battery.

20. A battery charging apparatus comprising:
a processor configured to:
- determine charging steps for each of main electrochemical reactions that change in response to a battery being charged;
- determine charging current ratios for each of the charging steps based on electrochemical characteristics corresponding to the charging steps; and
- generate a charging profile comprising charging currents for each of the charging steps based on the charging current ratios.

21. A processor-implemented battery charging method comprising:
- acquiring a functional relationship of a differential value of an amount of charge or a state of charge (SOC) with respect to a voltage of a battery based on the voltage or the SOC;
- determining charging steps for charging of the battery and a charging current associated with each of the charging steps by analyzing the functional relationship;
- setting a charging time; and
- generating a charging profile based on the charging time and an amount of charge to manage the battery,
- wherein the charging time is set by an input of a user.

22. The battery charging method of claim 21, wherein the charging time is determined and set by a charging system of the battery.

23. The battery charging method of claim 22, wherein the charging time corresponds to a fast charging mode of the battery.

24. The battery charging method of claim 21, wherein the amount of charge represents an estimated internal state of the battery.

25. The battery charging method of claim 24, wherein the amount of charge represents the SOC.

26. The battery charging method of claim 21, wherein the charging profile comprises charging the charging current for each of the charging steps to charge the battery.

27. The battery charging method of claim 26, further comprising determining whether charging within the charging time is sufficient to charge the battery based on the amount of charge.

28. The battery charging method of claim 27, wherein when charging of the battery is not sufficient, the charging profile is generated to charge the battery.

29. The battery charging method of claim 26, wherein the charging currents in the charging profile increase when the required charging time decreases, and decrease when the required charging time increases.

* * * * *